(12) United States Patent
Chen et al.

(10) Patent No.: US 8,687,070 B2
(45) Date of Patent: Apr. 1, 2014

(54) IMAGE CAPTURE DEVICE HAVING TILT AND/OR PERSPECTIVE CORRECTION

(75) Inventors: Jason Hau-Ping Chen, Santa Clara, CA (US); Brandon Dean Slack, Kitchener (CA); David I. Simon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 435 days.

(21) Appl. No.: 12/644,800

(22) Filed: Dec. 22, 2009

(65) Prior Publication Data

US 2011/0149094 A1 Jun. 23, 2011

(51) Int. Cl.
*H04N 5/228* (2006.01)
*H04N 5/222* (2006.01)

(52) U.S. Cl.
USPC .................................. 348/208.3; 348/333.03

(58) Field of Classification Search
None
See application file for complete search history.

(56) References Cited

U.S. PATENT DOCUMENTS

| | | | |
|---|---|---|---|
| 3,363,104 A | 1/1968 | Waite et al. | |
| 3,761,947 A | 9/1973 | Volkmann et al. | |
| 4,620,222 A | 10/1986 | Baba et al. | |
| 5,272,473 A | 12/1993 | Thompson et al. | |
| 5,274,494 A | 12/1993 | Rafanelli et al. | |
| 5,337,081 A | 8/1994 | Kamiya et al. | |
| 5,757,423 A | 5/1998 | Tanaka et al. | |
| 6,282,655 B1 | 8/2001 | Given | |
| 6,310,662 B1 | 10/2001 | Sunakawa et al. | |
| 6,339,429 B1 | 1/2002 | Schug | |
| 6,389,153 B1 | 5/2002 | Imai et al. | |
| 6,416,186 B1 | 7/2002 | Nakamura | |
| 6,516,151 B2 | 2/2003 | Pilu | |
| 6,560,711 B1 | 5/2003 | Given et al. | |
| 6,561,654 B2 | 5/2003 | Mukawa et al. | |
| 6,636,292 B2 | 10/2003 | Roddy et al. | |
| 6,807,010 B2 | 10/2004 | Kowarz | |
| 6,862,022 B2 | 3/2005 | Slupe | |
| 6,877,863 B2 | 4/2005 | Wood et al. | |

(Continued)

FOREIGN PATENT DOCUMENTS

| EP | 167314 | 1/1986 |
|---|---|---|
| EP | 2053844 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Luong T Nguyen
(74) *Attorney, Agent, or Firm* — Wong, Cabello, Lutsch, Rutherford & Brucculeri, LLP

(57) ABSTRACT

Methods and apparatuses are disclosed to correct for tilt and/or perspective distortion in image capture devices. In some embodiments, the method may include reading an orientation measurement associated with a relative position of an image capture device with respect to an object, determining if the orientation measurement is less than a threshold, and in the event that the orientation measurement is less than the threshold, correcting an image obtained by the image capture device. In some embodiments, the apparatus may include an image sensor, a memory coupled to the image sensor, an orientation measurement device coupled to the image sensor, and a distance measurement device coupled to the image sensor, where the image data may be stored in the memory along with a measurement from the accelerometer and along with a measurement from the distance measurement device.

19 Claims, 8 Drawing Sheets

(56) References Cited

U.S. PATENT DOCUMENTS

| | | | |
|---|---|---|---|
| 6,903,880 B2 | 6/2005 | Beatson et al. | |
| 6,921,172 B2 | 7/2005 | Ulichney et al. | |
| 6,924,909 B2 | 8/2005 | Lee et al. | |
| 6,930,669 B2 | 8/2005 | Weiner et al. | |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,123,298 B2 | 10/2006 | Schroeder et al. | |
| 7,307,709 B2 | 12/2007 | Lin et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,460,179 B2 | 12/2008 | Pate et al. | |
| 7,483,055 B2 * | 1/2009 | Moriya | 348/208.3 |
| 7,485,310 B2 | 2/2009 | Luyten | |
| 7,486,310 B2 * | 2/2009 | Sakurai et al. | 348/207.99 |
| 7,512,262 B2 | 3/2009 | Criminisi et al. | |
| 7,551,771 B2 | 6/2009 | England | |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,653,304 B2 | 1/2010 | Nozaki et al. | |
| 7,658,498 B2 | 2/2010 | Anson | |
| 7,714,897 B2 * | 5/2010 | Makela et al. | 348/221.1 |
| 7,834,846 B1 | 11/2010 | Bell | |
| 7,847,831 B2 * | 12/2010 | Kadono | 348/222.1 |
| 7,869,204 B2 | 1/2011 | Bair et al. | |
| 7,901,084 B2 | 3/2011 | Willey et al. | |
| 7,964,835 B2 | 6/2011 | Olsen et al. | |
| 8,044,880 B2 | 10/2011 | Nakamura et al. | |
| 2002/0021288 A1 | 2/2002 | Schug | |
| 2003/0038927 A1 | 2/2003 | Alden | |
| 2003/0086013 A1 | 5/2003 | Aratani | |
| 2003/0117343 A1 | 6/2003 | King | |
| 2004/0193413 A1 | 9/2004 | Wilson et al. | |
| 2005/0052558 A1 * | 3/2005 | Yamazaki et al. | 348/333.12 |
| 2005/0132408 A1 | 6/2005 | Dahley et al. | |
| 2005/0168583 A1 * | 8/2005 | Thomason | 348/208.4 |
| 2005/0182962 A1 | 8/2005 | Given et al. | |
| 2005/0280786 A1 | 12/2005 | Moiroux et al. | |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0058052 A1 | 3/2007 | Makela | |
| 2007/0177279 A1 | 8/2007 | Cho et al. | |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0088697 A1 | 4/2008 | Kadono | |
| 2008/0131107 A1 | 6/2008 | Ueno | |
| 2008/0158362 A1 | 7/2008 | Butterworth | |
| 2008/0191864 A1 | 8/2008 | Wolfson | |
| 2009/0008683 A1 | 1/2009 | Nishizawa | |
| 2009/0027337 A1 | 1/2009 | Hildreth | |
| 2009/0051797 A1 | 2/2009 | Yao | |
| 2009/0115915 A1 | 5/2009 | Steinberg et al. | |
| 2009/0221368 A1 | 9/2009 | Yen et al. | |
| 2009/0262306 A1 | 10/2009 | Quinn et al. | |
| 2009/0262343 A1 | 10/2009 | Archibald | |
| 2009/0273679 A1 | 11/2009 | Gere et al. | |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere et al. | |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0079884 A1 | 4/2010 | Gere et al. | |
| 2010/0083188 A1 | 4/2010 | Pance et al. | |
| 2010/0103172 A1 | 4/2010 | Purdy | |
| 2011/0074931 A1 | 3/2011 | Bilbrey et al. | |
| 2011/0075055 A1 | 3/2011 | Bilbrey | |
| 2011/0115964 A1 | 5/2011 | Gere | |
| 2012/0044328 A1 | 2/2012 | Gere | |
| 2012/0076363 A1 | 3/2012 | Kessler et al. | |

FOREIGN PATENT DOCUMENTS

| | | |
|---|---|---|
| JP | 2002354493 | 12/2002 |
| JP | 2004343476 | 12/2004 |
| JP | 2006115346 | 4/2006 |
| JP | 2006165941 | 6/2006 |
| JP | 2006279373 | 10/2006 |
| JP | 2009218661 | 9/2009 |
| WO | WO93/11631 | 6/1993 |
| WO | WO2007/100057 | 9/2007 |
| WO | WO2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

International Search Report, PCT/US2010/054667, 4 pages, Feb. 4, 2011.

First Office Action received in MX Application No. MX/a/2012/007345, dated Jun. 6, 2013.

Office Action received in TW Application No. 099142670, dated Jun. 28, 2013.

Office Action received in AU Application No. 2010333908, dated Jul. 19, 2013.

Office Action received in JP Application No. 2012-545944, dated Jul. 31, 2013.

* cited by examiner

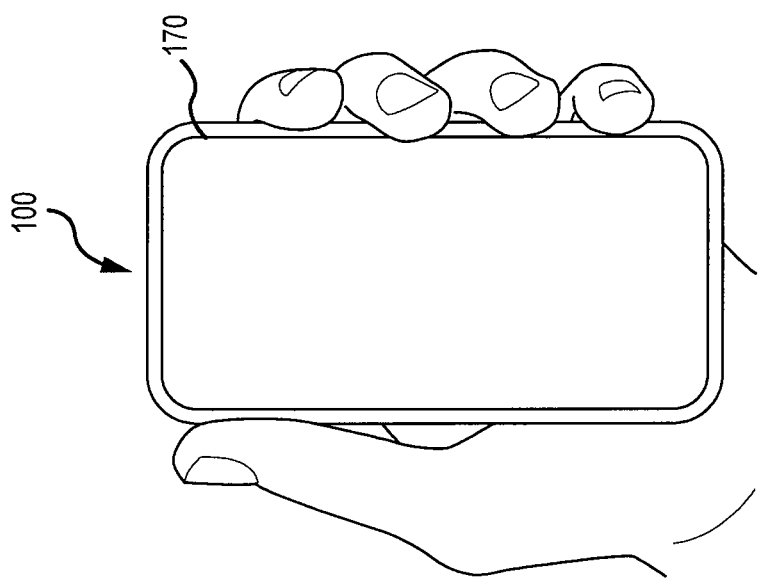
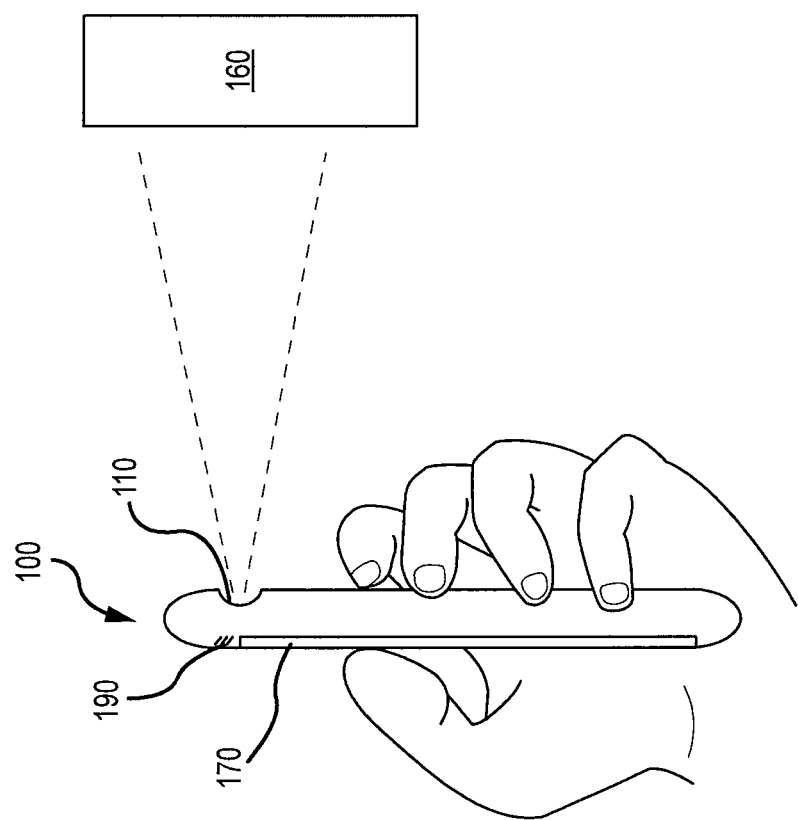

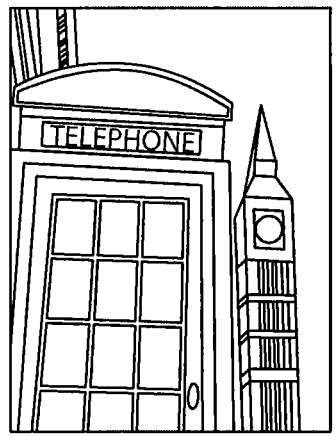
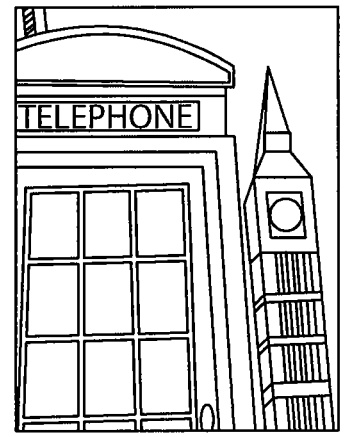
FIG.7A  FIG.7B
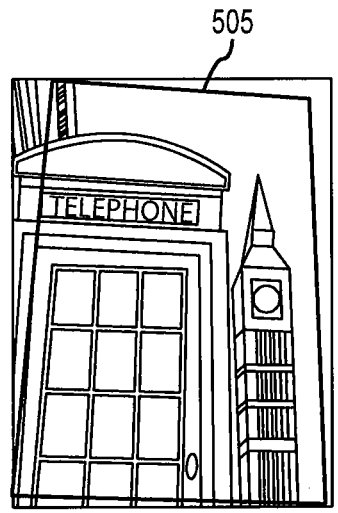
FIG.7C

IMAGE CAPTURE DEVICE HAVING TILT AND/OR PERSPECTIVE CORRECTION

BACKGROUND OF THE INVENTION

Background

I. Technical Field

The present invention relates generally to image capture devices in electronic systems, and more particularly to image capture devices having the ability to correct for tilt and/or perspective distortion.

II. Background Discussion

Electronic devices are ubiquitous in society and can be found in everything from wristwatches to computers. Many electronic devices now have integrated image capture devices, and so users of these electronic devices now have the ability to take pictures on an impromptu basis. For example, in the event that a user does not have a camera in their possession but does have a cell phone or other personal media device that includes an integrated image capture device, then the user may be able to take a picture instead of foregoing the opportunity to take the picture altogether. While the ability to take pictures using these electronic devices may be advantageous, it is often difficult for the user to steady these electronic devices and/or keep them level while taking the picture. This lack of ability to steady the electronic devices and/or keep them level while taking the picture often results in distortion in the picture being tilted and/or having a perspective that is less pleasing to the user.

In fact, tilted pictures and/or pictures with an incorrect perspective may also be taken from cameras. For example, a user may not have a tripod when taking a picture with a camera and so the user may take a picture at an angle. Regardless of whether a distorted picture is produced using a camera or an electronic device having an integrated image capture device, it is often corrected through post-processing. Unfortunately, this post-processing may require sophisticated image processing software and/or a substantial amount of involvement by the user to correct the distortion.

SUMMARY

Methods and apparatuses are disclosed to correct or compensate for tilt and/or perspective distortion in image capture devices, either in part or in full. In some embodiments, the method may include reading an orientation measurement associated with a relative position of an image capture device with respect to an object, determining if the orientation measurement is less than a threshold, and, in the event that the orientation measurement is less than the threshold, correcting an image obtained by the image capture device.

Other embodiments may include an image capture device that has an image sensor, a memory coupled to the image sensor, an orientation measurement device coupled to the image sensor, and a distance measurement device coupled to the image sensor. Image data captured by the sensor may be stored in the memory along with a measurement from the accelerometer and/or a measurement from the distance measurement device.

Still other embodiments may take the form of a method of correcting image distortion including reading a distance measurement from a distance measurement device, where the distance measurement is associated with a distance between an image capture device and an object being photographed, reading an orientation measurement associated with an image capture device, and correcting an image data representative of the object being photographed using the distance measurement and the orientation measurement.

BRIEF DESCRIPTION OF THE DRAWINGS

FIG. 2A illustrates a side view of an embodiment of the image capture device.

FIG. 2B illustrates a front view of the embodiment shown in FIG. 2A.

FIG. 7A illustrates an image including perspective distortion.

FIG. 7B illustrates the image of FIG. 7A with the perspective distortion corrected.

FIG. 7C illustrates the image of FIG. 7A including dynamic crop lines.

The use of the same reference numerals in different drawings indicates similar or identical items.

DETAILED DESCRIPTION OF THE INVENTION

Figure 1A:
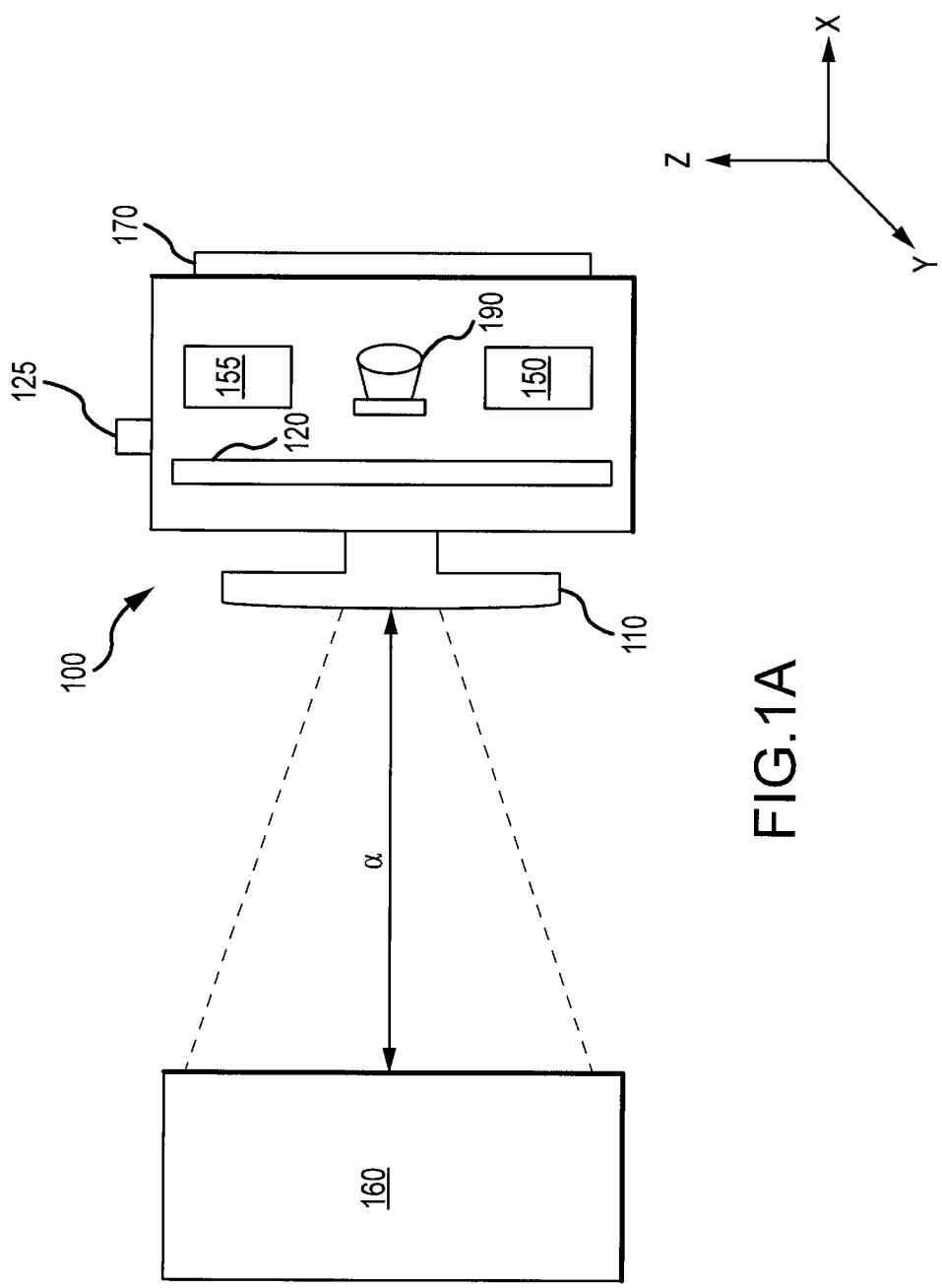
FIG. 1A illustrates an image capture device capable of correcting distortion in photographs.

Embodiments of electronic devices are disclosed that allow the electronic device to correct for tilt and/or perspective distortion in photographs taken with the image capture device. As used herein, the term "image capture device" is intended to refer to electronic devices that have the ability to take still photographs and/or video. Such electronic devices may include digital cameras as well as consumer electronic devices with integrated cameras (e.g., cell phones or personal media players). Also, as used herein, the term "photograph" is intended to refer to an image that is selected by the user for storage. The disclosed image capture devices may include accelerometers and/or distance measurement sensors that record physical orientation data of the image capture device with respect to the object being photographed. This orientation data may be used to correct distortion of the photographs and/or video taken by the image capture device. The orientation data also may be used in conjunction with distance data to correct perspective distortion in the photographs and/or video taken by the image capture device. In some embodiments, this correction may be performed by the image capture device on-the-fly as the photograph and/or video is being taken. In other embodiments, this correction may be performed on the photographs and/or video after they are taken. In such cases, the orientation and/or distance data may be embedded in the image data file used to record the photograph and/or video for later use. In still other embodiments, the image capture device may utilize the orientation data and/or distance data to interactively indicate a level of distortion to the user and allow the user to adjust the physical orientation of the image capture device to correct the distortion. For example, in some embodiments, dynamic crop lines or a virtual level may be displayed to the user to indicate the action necessary to level the camera.

Although one or more of the embodiments disclosed herein may be described in detail with reference to a particular electronic device, the embodiments should not be interpreted or otherwise used as limiting the scope of the disclosure, including the claims. In addition, one skilled in the art will understand that the following description has broad application. For example, while embodiments disclosed herein may focus on certain portable electronic devices, such as cameras or cell phones, it should be appreciated that the concepts disclosed herein equally apply to other portable electronic devices that incorporate integrated cameras. For example, the concepts disclosed herein may be employed in wristwatches with integrated cameras. In addition, it should be appreciated that the concepts disclosed herein may equally apply to non-portable electronic devices, such as desktop computers. Furthermore, while embodiments disclosed herein may focus on correcting distortion utilizing accelerometers and/or distance measurement sensors, the concepts disclosed herein equally apply to other sensors that measure the physical orientation of the image capture device with respect to the object being photographed. For example, in some embodiments, the object being photographed and the image capture device may each include global positioning system (GPS) devices such that the relative GPS orientation of the object and the image capture device may be recorded along with the image data. Also, although this disclosure may focus on still images, the concepts disclosed herein equally apply to recording moving images and/or video. Accordingly, the discussion of any embodiment is meant only to be exemplary and is not intended to suggest that the scope of the disclosure, including the claims, is limited to these embodiments.

Figure 1B:
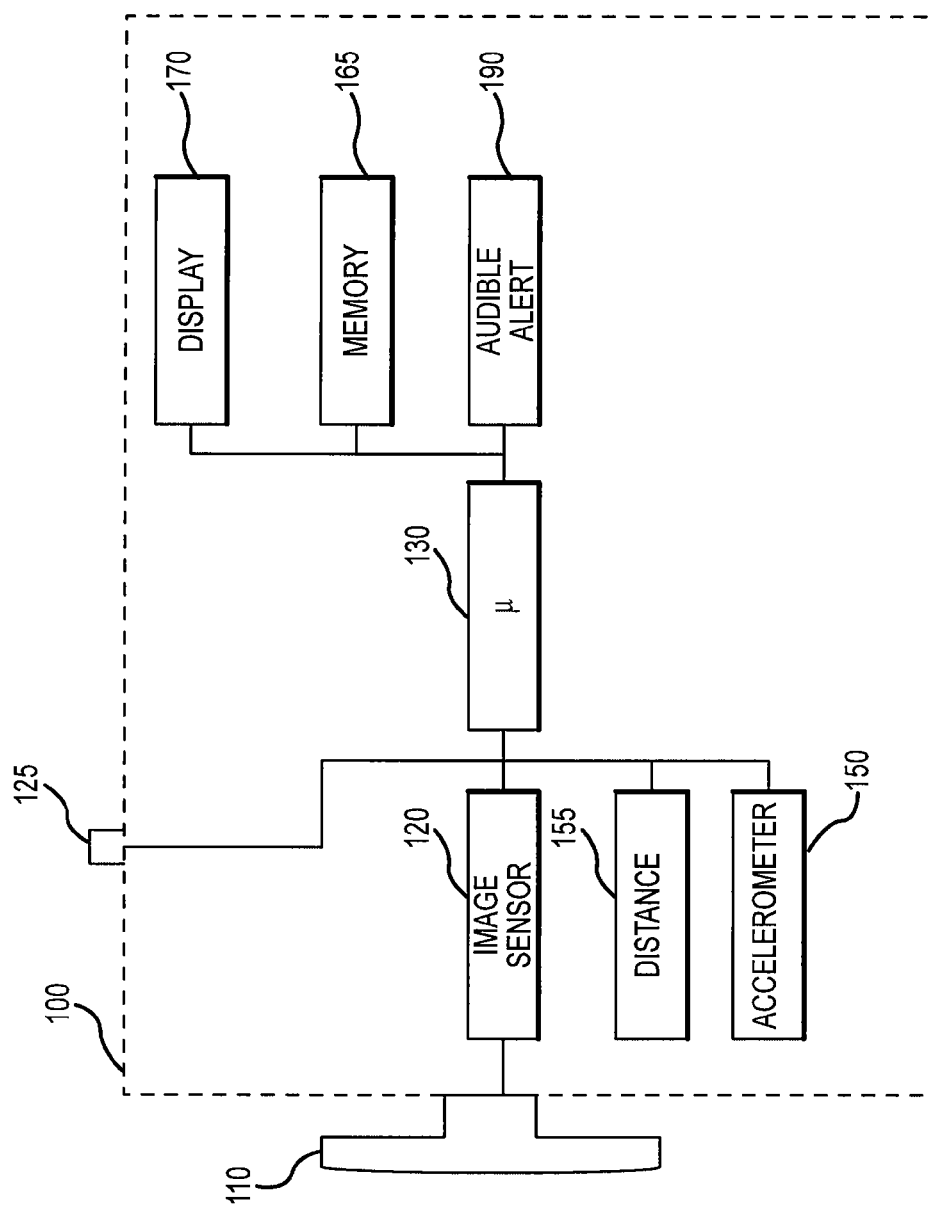
FIG. 1B illustrates a block diagram of the image capture device.

FIG. 1A illustrates an image capture device 100 capable of correcting, or at least partially compensating for, distortion in photographs. FIG. 1B illustrates a block diagram of the image capture device 100. Although FIGS. 1A and 1B illustrate a certain physical layout, it should be appreciated that this is merely for discussion purposes. Referring to FIGS. 1A and 1B, the image capture device 100 may include an aperture 110 capable of controlling the amount of light entering the image capture device 100 and passing this light along to an image sensor 120 through a lens 121. Implementations of the image sensor 120 may vary between embodiments. For example, in some embodiments, the image sensor 120 may be implemented using a complementary metal oxide semiconductor sensor.

The image sensor 120 may be coupled to a processor 130 (as shown in FIG. 1B) that controls the general operation of the image capture device 100. In some embodiments, the image sensor 120 is actuated through a switch 125, where the switch 125 may be a physical switch on the image capture device 100 as shown in FIG. 1A, or alternatively may be a capacitively controlled switch on a display screen 170. In other embodiments, the image sensor 120 may be actuated by the processor 130 without the switch 125, such as with a software interface that may be actuated separate from the display screen 170.

In addition to being coupled to the image sensor 120 and the switch 125, the processor 130 may couple to one or more orientation sensors, such as an accelerometer 150 and a distance measurement sensor 155. In some embodiments, the accelerometer 150 may be a micromechanical three dimensional accelerometer, such as the LIS302DL model available from STMicroelectronics. Other embodiments may employ gyroscopes, inertial reference sensors, and/or compasses in place of the accelerometer 150 or in conjunction with the accelerometer 150. As the image capture device 100 is rotated about any of the X, Y, and/or Z axes the accelerometer 150 may report this movement to the processor 130.

The distance measurement sensor 155 may be implemented using an active auto focus system that includes ultrasonic and/or infrared sensors that emit sound and/or light respectively. The distance between the image capture device 100 and an object 160 being photographed can then be determined by measuring the time of flight of delay in either the sound or light reflected from the object 160. In other embodiments, the distance measurement may be obtained by determining the focal position of the lens 121—i.e., correlating a physical position of the lens 121 to a distance between the object 160 and the image capture device 100.

As shown in FIG. 1B, the processor 130 may further couple to a memory 165 that stores image data optimally, as well as orientation and distance data, under the direction of the processor 130. A display 170 also may couple to the processor 130 to give a user of the image capture device 100 an idea of what the image that is being photographed looked like. In some embodiments, the user may depress the switch 125 and a potential image of the object 160 may be displayed on the display 170. The image capture device 100 also may include an audible alert device 190 that couples to the processor 130 and is capable of generating an audible alert under the direction of the processor 130. As will be described in greater detail below, this audible alert may be used to communicate certain information to the user, such as if a potential image includes distortion.

FIGS. 2A and 2B illustrate an embodiment of the image capture device 100, specifically a handheld device such as a cell phone or personal media device. In some embodiments, the image capture device 100 shown in FIGS. 2A and 2B may be an IPHONE mobile phone or an IPOD TOUCH portable media player, both available from Apple Inc. In the embodiments where the image capture device 100 is implemented as an IPHONE, then the audible alert device 190 may be the speaker of the IPHONE and the display 170 may be the screen of the IPHONE.

Regardless of the particular implementation of the image capture device 100, during operation, light reflected from the object 160 may be transmitted through the aperture 110 to the image sensor 120. The image sensor 120 may convert this incident light to image data. When a photograph is taken by the user, such as by depressing the switch 125, this image data then may be stored by the processor 130 in the memory 165 along with orientation data from the accelerometer 150 and/or distance data from the distance sensor 155. Orientation data generally refers to data related to the orientation of the image capture device 100 with respect to its surroundings. For example, in some embodiments, the orientation data discussed herein refers to measurements of the Earth's gravitational pull along the X, Y, and Z axes as measured by the accelerometer 150. In other embodiments, the accelerometer 150 may be used to determine if the image capture device 100 is moving, e.g., in a vehicle, and the orientation data may represent the velocity or acceleration of the image capture device 100. Distance data generally refers to a distance between the image capture device 100 and the object being photographed. As was alluded to above, the distance data may be the result of time of AF measurements, a function of the focal position of the lens 121, or alternatively, may be the result of differences between the GPS coordinates of the image capture device 100 and the object being photographed.

In some embodiments, the orientation data and/or distance data may be stored into the memory 165 as metadata linked to the image data. For example, in some embodiments, this data may be stored in a format that is compatible with the International Press Telecommunications Council (IPTC) format, such that the orientation and distance data are stored in the memory 165 as part of a header of the image data file. In other embodiments, the orientation and distance data may be stored in Exchangeable Image File Format (EXIF). For example, an EXIF file may be modified to include custom tags within the EXIF file that store three axis orientation data recorded by the accelerometer 150 and/or the distance a recorded by the distance sensor 155.

In some embodiments, the processor 130 may utilize the orientation data recorded by the accelerometer 150 and/or the distance data recorded by the distance sensor 155 to correct image distortion on the display 170 on-the-fly as the photograph is taken. In other embodiments, the image capture device 100 may notify the user that image distortion is present in the image that is about to be photographed.

Figure 3A:
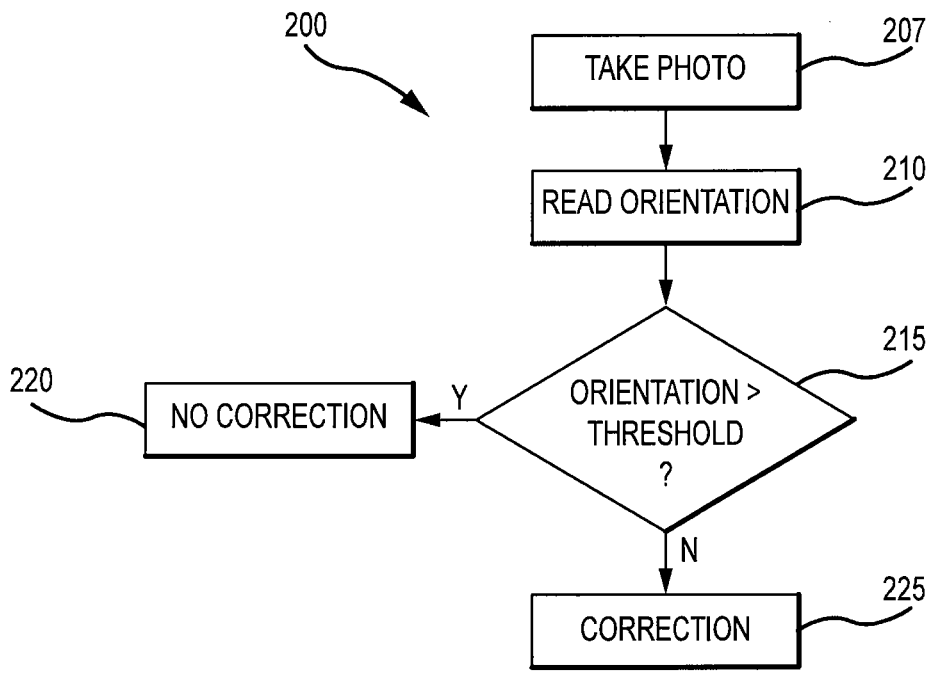
FIG. 3A illustrates operations performed for correcting distortion using orientation data.
Figure 3B:
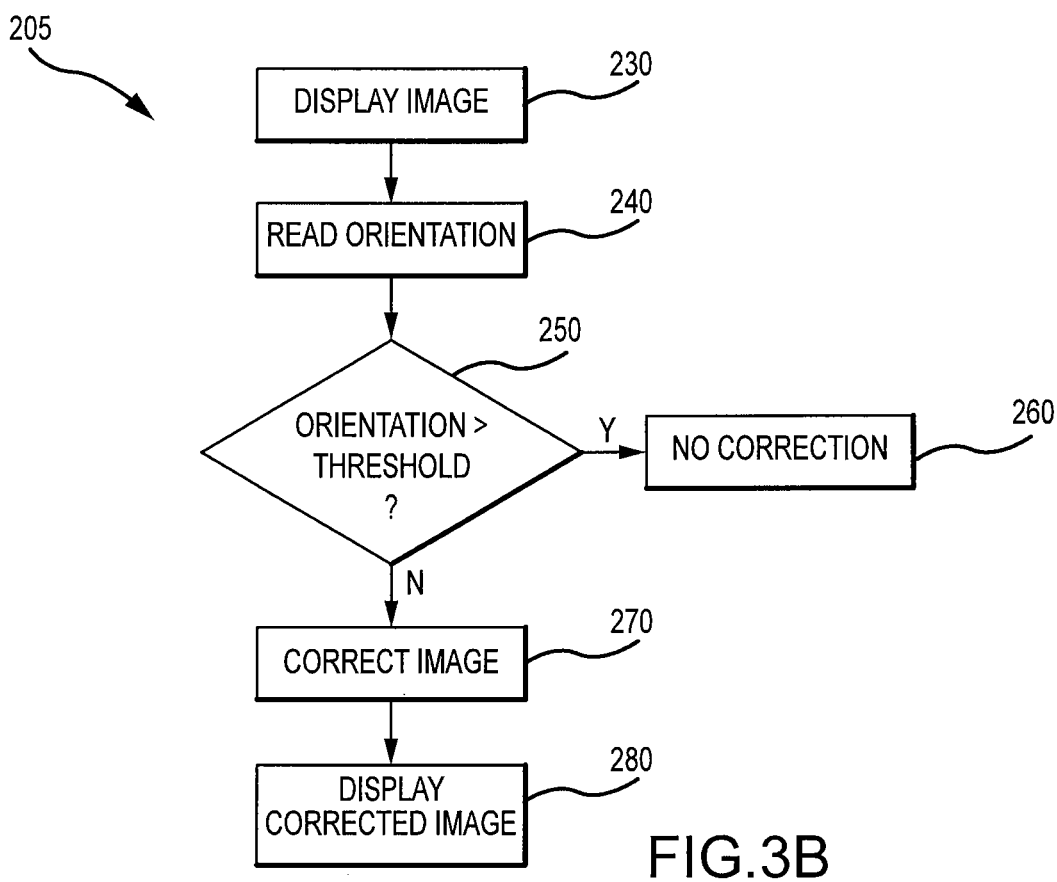
FIG. 3B illustrates on-the-fly operations performed for correcting distortion using orientation data.

FIGS. 3A and 3B illustrate two series of operations 200, 205 that may be performed by the image capture device 100 to correct for distortion using orientation data. Such distortion may include tilt of the image data in the X, Y, and/or Z directions. Operations 200 may apply to correcting a photograph after it is taken whereas operations 205 may apply to correcting an image prior to taking the photograph. Referring first to the series of operations 200 in conjunction with FIGS. 1A and 1B, in operation 207, a photograph of the object 160 may be taken and recorded in the memory 165. The stored photograph may include image data as well as orientation and/or distance data. (The use of distance data along with orientation data to correct perspective distortion is discussed in greater detail below). In addition to recording the image data associated with the photograph during operation 207, orientation data from the accelerometer 150 may be stored in the memory 165. The orientation data may be linked with the image data. For example, in some embodiments, the orientation data may be embedded into a header of the image data file. Continuing the example, the header may be in the IPTC format. Furthermore, in other embodiments, the orientation data may be recorded with a time stamp that corresponds to a time stamp of the image data. For example, the processor 130 may generate a time stamp when the image sensor 120 obtains an image of the object 160, and this time stamp may be used to index the image data to the orientation as the orientation data is stored in the memory 165. Because the image data as well as the orientation data are indexed with a time stamp, they may be stored at different locations within the memory 165. This may simplify the memory management tasks of the processor 130. Note that memory 165 may exist locally within the image capture device 100, or alternatively, may exist in a location that is remote to the image capture device 100. For example, the image capture device 100 may send the image data through a wireless connection to a remote storage location.

Next, in operation 210, the orientation data may be read by the processor 130. For example, in some embodiments, the processor 130 may read the header data of the ITPC formatted image data to obtain the orientation data. Other embodiments may include the header data being read by a processor that is external to the image capture device 100. Regardless of where the header data is read, based upon this reading, the physical orientation of the image capture device 100 may be determined with respect to the X, Y, and/or Z axes, such as the angle of tilt in the X, Y, and/or Z axes.

In some cases, the user of the image capture device 100 may intentionally tilt the image capture device 100 with respect to the X, Y, and/or Z axes when photographing the object 160. Thus, the angle of tilt read in operation 210 may represent a deliberate shooting angle. Accordingly, in order to discern deliberate tilt of the image capture device 100 from unintentional tilt, the processor 130 may determine if the orientation reading is greater than a threshold that is associated with deliberate tilt with respect to the X, Y, and/or Z axes, as is done in operation 215. In some embodiments, the threshold may be five degrees. Thus, any tilt greater than five degrees may be interpreted by the image capture device 100 as intentional and not compensated. Furthermore, in some embodiments, the threshold may be programmable by the user. Also, the threshold may include three independent thresholds for the X, Y, and/or Z axes such that the X axis has a different threshold than the Y or Z axis and the Y axis has a different threshold than the X or Z axis, and so on. Note that the threshold levels may be auto-generated, automatically refined over time by software based upon user preferences, determined by analyzing a database of similar photos, and/or varied based on inputs from other sensors (e.g., distance measurements may indicate more aggressive threshold levels for objects further away).

In the event that the orientation data is greater than the selected threshold value, then the tilt may be interpreted by the processor 130 as intentional and the photograph may be stored in the memory 165 without correction, as shown in operation 220. On the other hand, in the event that the processor 130 determines that the orientation reading is less than the threshold, then the photograph may be corrected prior to storage in the memory 165 per operation 225. The correction operation 225 may include a variety of operations, such as adjusting the photograph clockwise and/or counter clockwise to remove the unintentional tilt prior to storage in the memory 165. Since the threshold comparison in operation 215 may include different thresholds in multiple dimensions, the ultimate determination as to whether the image capture device 100 is deliberately tilted (such that no correction to the photograph is made before storage in the memory 165) may vary between embodiments. For example, in some embodiments, if the orientation reading indicates one or more of the three dimensions, then the photograph may be corrected (per operation 225) in the dimension that exceeds the threshold value. In other embodiments, the photograph may not be corrected (per operation 225) unless the orientation reading indicates that two of the three dimensions are greater than the their respective thresholds. In still other embodiments, the photograph may not be corrected (per operation 225) unless the orientation reading indicates that all three of the dimensions are greater than the their respective thresholds. In yet other embodiments, a transformation correction filter may be computed regardless of orientation thresholds, where a limit to the amount of transformation may be calculated and used instead of the orientation thresholds.

In at least one embodiment, the correction operation 225 may include approximating an angle of straight edges in the captured image. If the straight edges become very close to being vertical after the accelerometer data is applied to straighten the captured image, then the entire captured image may be made substantially vertical by applying the changes made to the straight edges to the rest of the captured image. Thus, in these embodiments, the thresholds may be used to determine how close the straight edges are to being vertical.

In addition to correcting the photograph prior to storing it in the memory 165, the photograph may be corrected on-the-fly when displaying an image of the potential photograph to the user. This is illustrated in the operations 205 shown in FIG. 3B. Referring now to the operations 205 in conjunction with FIGS. 1A and 1B, an image of the potential photograph may be displayed on the display 170 in operation 230. This may occur as a result of the user depressing the switch 125 to indicate that the user is about to take a photograph. Orientation data from the accelerometer 150 may be read by the processor 130 during operation 240 and used to determine if the image of the potential photograph includes distortion. For example, the reading taken during operation 240 may be used to determine if the image displayed to the user on the display 170 (i.e., the potential photograph) includes distortion, or alternatively, if the user has deliberately tilted the image capture device 100. This is shown in operation 250. As was the case with operation 215, operation 250 may include determining whether the image capture device 100 has been deliberately tilted by comparing the orientation data reading from operation 240 with one or more threshold values. In the event that the orientation data read from the accelerometer 150 is greater than the threshold, then the processor 130 may interpret this as deliberate tilt by the user and forego correction of the image displayed to the user on the display 170. This is shown in operation 260. In the event that the orientation data read during the operation 240 is less than the threshold value, then the processor 130 may interpret this image distortion as deliberate and correction may be performed on the image prior to taking the photograph per operation 270 and the corrected image may be displayed to the user per operation 280. In this manner, the user could determine if the correction was adequate prior to taking the photograph.

Figure 4A:
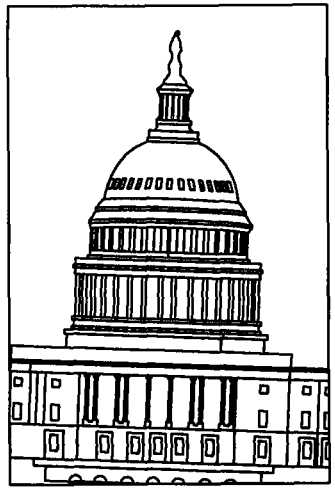
FIG. 4A illustrates an image including distortion along the X axis.
Figure 4B:
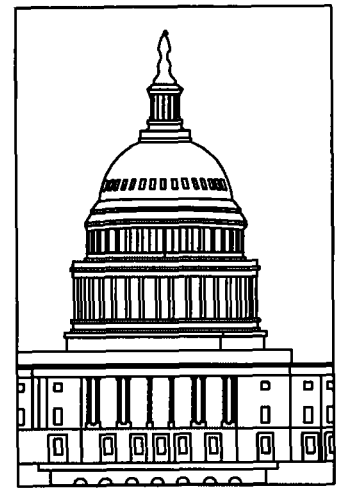
FIG. 4B illustrates the image of FIG. 4A with the distortion corrected.

FIGS. 4A and 4B respectively illustrate distortion and on-the-fly correction of an image distorted in the X axis. Although FIGS. 4A and 4B focus on distortion along the X axis of the image for the sake of discussion, this discussion equally applies to distortion along Y and/or Z axes as well. Referring now to FIGS. 4A and 4B, FIG. 4A illustrates an image of the United States Capitol Building that may be displayed on the display 170. As can be appreciated from inspection of FIG. 4A, the image of the Capitol Building is tilted along the X axis. For the sake of discussion, it is assumed that the image shown in FIG. 4A is tilted less than the threshold amount indicated in operation 250—i.e., the tilt is unintentional. Because of this, the image displayed on the display 170 may be corrected on-the-fly per operations 205. FIG. 4B illustrates this same image in corrected form where the image is substantially free of X axis distortion per operation 280. Now, when the user takes the photograph, the image data stored in the memory 165 may be substantially free of distortion. In these embodiments, since the orientation data has been used to correct the image data on-the-fly, then the accelerometer data optionally may be stored in the memory 165, or in order to conserve space in the memory, the orientation data may be discarded.

Figure 4C:
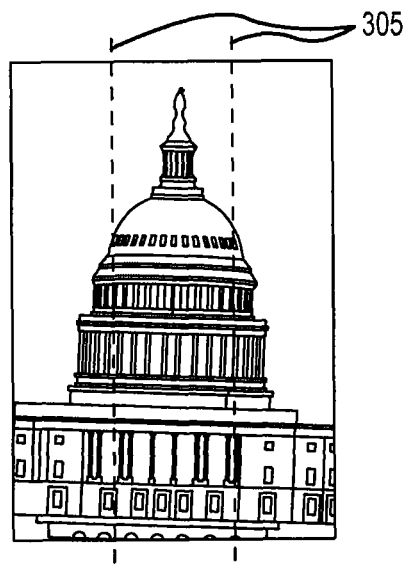
FIG. 4C illustrates the image of FIG. 4A with distortion indicators.

In the embodiments where correction on-the-fly is performed, the image capture device 100 may alert the user visually, audibly, physically through vibration feedback, and/or haptics that the correction has occurred. For example, in some embodiments, when the image capture device 100 has performed on-the-fly correction, the image capture device 100 may indicate this to the user by actuating the audible alert device 190. In other embodiments, such as when the image capture device 100 is a cell phone, the phone may alert the user through vibration that a correction has occurred. In still other embodiments, the image capture device 100 may indicate that on-the-fly correction has been performed visually to the user by displaying an on-the-fly distortion correction icon (not specifically shown) on the display 170. In yet other embodiments, instead of correcting the image (operation 270) and displaying the corrected image (operations 280) the image capture device 100 may display distortion indicators 305 on the originally displayed image such that the user can gauge the amount of cropping that may take place prior to allowing the image capture device 100 to perform the on-the-fly correction and storing the photograph in the memory 165. FIG. 4C illustrates the distorted image of the Capitol Building from FIG. 4A where the distortion indicators 305 have been imposed on the image displayed on the display 170. The distortion indicators 305 may be calculated by the processor 130 such that they correspond with a desired orientation along the X, Y, and/or Z axes. For example, referring to FIG. 4C in conjunction with FIG. 1A, the distortion indicators 305 are shown as orthogonal to the plane of the image capture device 100 defined by the X and Y axes.

Figure 5:
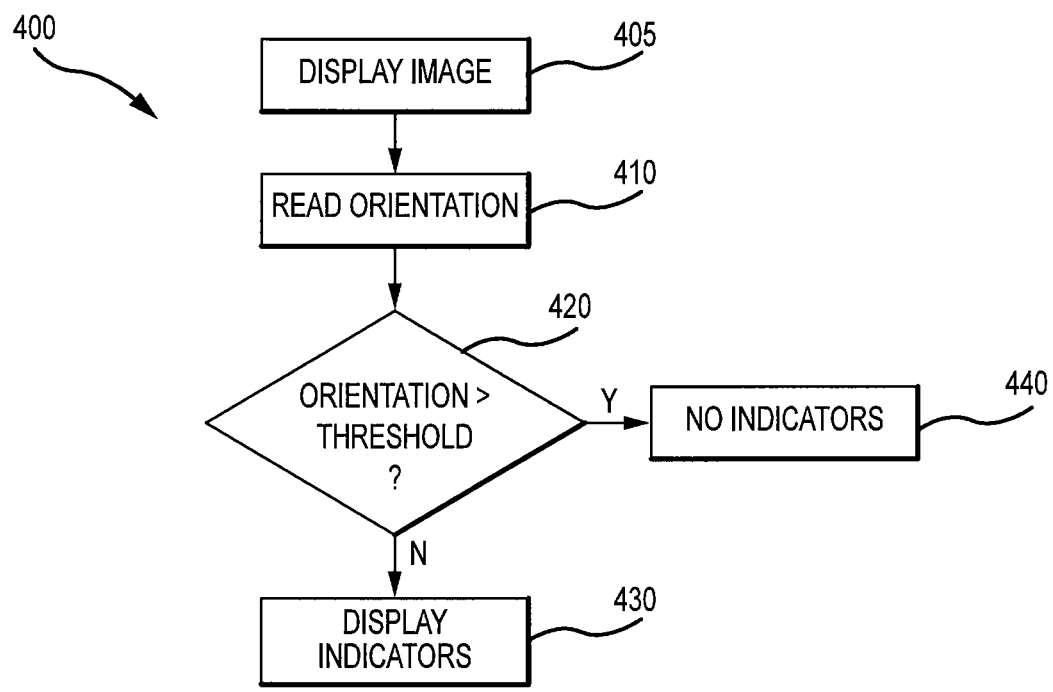
FIG. 5 illustrates operations that may be used to implement the distortion indicators of FIG. 4C.

FIG. 5 illustrates the operations 400 that may be used to implement the distortion indicators 305 shown in FIG. 4C. As was the case for the operations 205, the operations 400 may begin by displaying the image to the user in operation 405, reading orientation data in operation 410 and determining whether the orientation data is greater than the threshold in operation 420. In the event that the orientation data indicates that the distortion is unintentional, i.e., tilt is less than the threshold, then the processor 130 may display the distortion indicators 305 per operation 430. In some embodiments, this may occur as a result depression of the switch 125 to indicate the user desires to take a photograph of the image on the display 170 (during operation 405), and therefore, the user may have the opportunity to manually correct the image by tilting the image capture device 100 to align the image with the distortion indicators 305 shown on the display 170 during operation 430. In the event that operation 420 indicates that the orientation is greater than the threshold (e.g., the tilt is deliberate), then the distortion indicators 305 may be omitted from the display 170 per operation 430.

Figure 6:
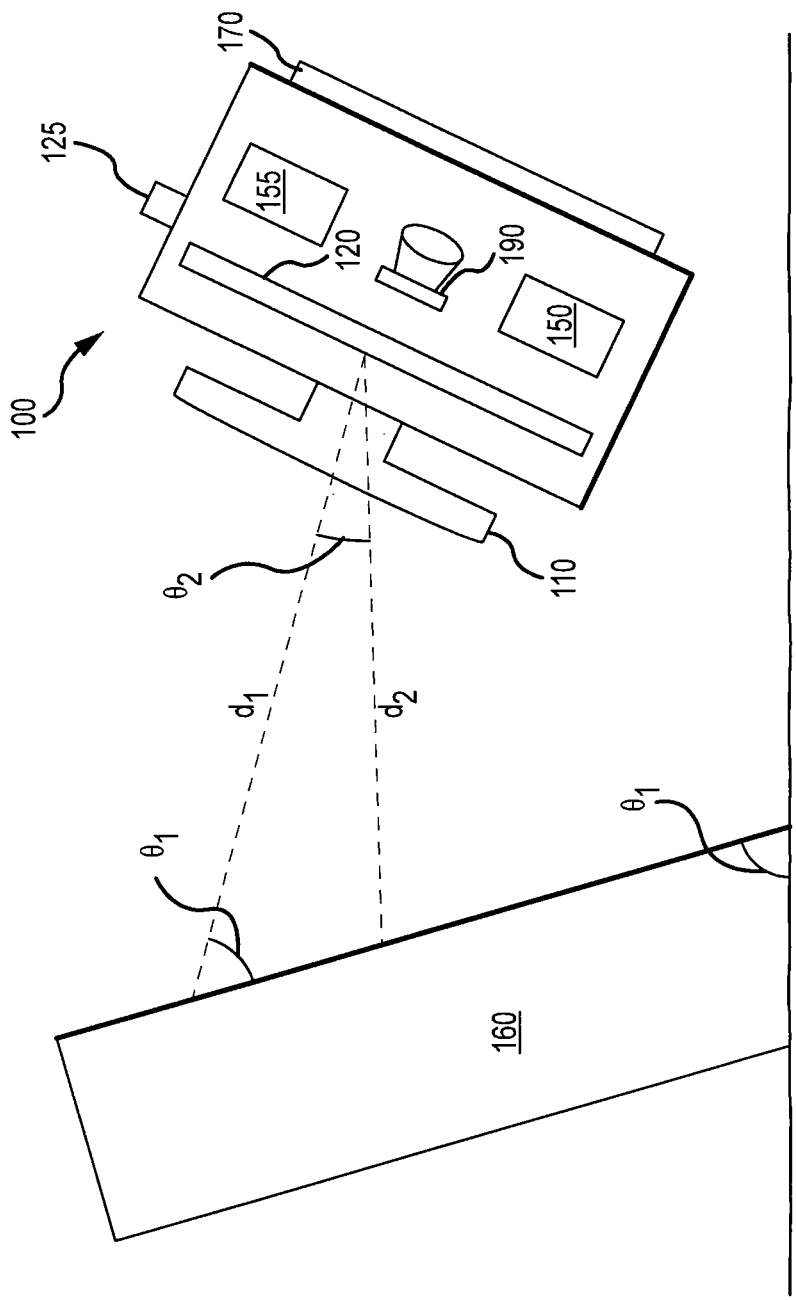
FIG. 6 illustrates potential perspective distortion when operating the image capture device of FIG. 1.

In addition to correcting for image distortion in the X, Y, and/or Z axes, the orientation data as measured by the accelerometer 150 may be used in conjunction with distance data to correct perspective distortion present in the image of the object 160. The term "perspective distortion" generally refers to a warping of the object 160 that stems from the image sensor 120 and the object 160 being at angles with respect to each other. FIG. 6 illustrates potential perspective distortion when operating the image capture device 100 shown in FIG. 1. Referring to FIG. 7, the object 160 is in a substantially non-vertical position with respect to the ground and/or horizon, indicated by $\theta_1$. As a result of this relative non-vertical positioning, the image presented to the image sensor 120 may be warped or skewed and the photograph of this image will have perspective distortion. For example, FIG. 7A illustrates an image of Big Ben that may be displayed on the display 170, including perspective distortion.

In some embodiments, the distance measurement sensor 155 may provide one or more distance measurements to be used in conjunction with the orientation data from the accelerometer 150 in order to correct for perspective distortion. For example, in some embodiments, the distance measurement sensor 155 may measure the distance $d_1$ of a vector that is orthogonal to the image sensor 120 and extends between the image sensor 120 and the object 160. Additionally, the distance measurement sensor 155 may measure the distance $d_2$ of a vector that is parallel to the ground and extends between the image sensor 120 and the object 160. Furthermore, the accelerometer 150 may measure the angle of the image sensor 120 with respect to the ground $\theta_2$. Based upon the distance measurements $d_1$ and $d_2$ as well as the angle $\theta_2$, the angle of the object 160 with respect to the horizon $\theta_1$ may be determined through trigonometric operations. By calculating the angle $\theta_1$ with the processor 130, perspective distortion may be corrected for using a perspective transformation operation on-the-fly prior to storing the image data in the memory 165. As mentioned above, such on-the-fly correction may conserve space in the memory 165. FIG. 7B illustrates the image of FIG. 7A processed with a perspective distortion transformation. In other embodiments, the distance measurements $d_1$ and $d_2$ as well as the angle $\theta_2$ may be stored in the header of the image data so that the perspective transformation may be applied by calculating the angle $\theta_1$ at a later time.

As can be appreciated from comparing FIGS. 7A and 7B, a portion of the image data was cropped out of FIG. 7A to preserve the aspect ratio of the original image when correcting for perspective distortion. Similarly, as can be appreciated from comparing FIGS. 4A and 4B, a portion of the image data was cropped out when correcting for tilt distortion. Because image data is to be cropped out of the image when correcting for tilt or perspective distortion, some embodiments may indicate the portion that is to be cropped out to the user on the display 170 using dynamic crop lines. FIG. 7C illustrates dynamic crop lines 505 imposed on the image illustrated in FIG. 7A. The dynamic crop lines 310 may aid the user in framing the object to be photographed such that user desired details are preserved after tilt and/or perspective distortion correction.

What is claimed is:

1. A method of compensating for image distortion comprising the acts of:
   reading an orientation measurement of an image capture device during a capture of an image, the image comprising image data;
   determining an orientation of one or more straight edges in the image;
   determining a difference between the orientation measurement of the image capture device and the orientation of the one or more straight edges; and
   correcting the image by modifying the image data if the difference is less than a threshold.

2. The method of claim 1, further comprising the act of storing the image in a memory.

3. The method of claim 2, wherein the act of correcting the image occurs prior to the act of storing the image.

4. The method of claim 3, wherein the act of correcting the image occurs on-the-fly.

5. The method of claim 2, further comprising the act of displaying the corrected image on a display prior to the act of storing the image.

6. The method of claim 1, further comprising the act of displaying a distortion indicator on a display along with the image, wherein the distortion indicator is related to the orientation measurement of the image capture device.

7. The method of claim 1, wherein the act of correcting the image includes compensating for distortion of the image along at least one of a X axis, a Y axis, or a Z axis.

8. The method of claim 7, wherein the act of determining the difference includes determining a difference between the measured orientation of the image capture device and the orientation of the one or more straight edges in at least two of the X, Y, and Z axes.

9. A non-transitory program storage device, readable by a processor and comprising instructions stored thereon to cause one or more processors to:
   obtain an orientation measurement of an image capture device during an image capture operation, wherein a captured image comprises data representative of a scene;
   identify one or more straight edges in the data corresponding straight edges in the scene;
   determine a difference based, at least in part, on the measured orientation of the image capture device and an orientation of at least one of the one or more straight edges in the data; and
   modify the data when the difference is less than a threshold value.

10. The non-transitory program storage device of claim 9, wherein the instructions to cause the one or more processors to obtain the orientation measurement of the image capture device comprise instructions to cause the one or more processors to obtain the orientation measurement of the image capture device along each of one or more axes relative to the image capture device.

11. The non-transitory program storage device of claim 10, wherein the instructions to cause the one or more processors to determine the difference comprise instructions to cause the one or more processors to determine the difference based, at least in part, on the measured orientation of the image capture device along a first axis of the axes and an orientation of at least one of the one or more straight edges in the data along the first axis.

12. The non-transitory program storage device of claim 11, wherein the instructions to cause the one or more processors to determine the difference further comprise instructions to cause the one or more processors to determine an angular difference between the measured orientation of the image capture device along the first axis and the orientation of the at least one of the one or more straight edges in the data along the first axis.

13. The non-transitory program storage device of claim 10, wherein the instructions to cause the one or more processors to modify the data comprise instructions to cause the one or more processors to modify the data so that the orientation of the at least one of the one or more straight edges in the data is aligned with the measured orientation of the image capture device.

14. The non-transitory program storage device of claim 10, wherein the instructions to cause the one or more processors to modify the data comprise instructions to cause the one or more processors to modify the data so that the orientation of the at least one of the one or more straight edges in the data is aligned near but not exactly with the measured orientation of the image capture device.

15. The non-transitory program storage device of claim 10, wherein the instructions to cause the one or more processors to determine the difference comprise instructions to cause the one or more processors to:
   determine a first angular difference between an orientation of a first of the one or more straight edges in the data and the measured orientation of the image capture device along a first of the one or more axes; and
   determine a second angular difference between an orientation of the first straight edge and the measured orientation of the image capture device along a second of the one or more axes.

16. The non-transitory program storage device of claim 15, wherein the instructions to cause the one or more processors to modify the data comprise instructions to cause the one or more processors to:
   modify the data so that the orientation of the first straight edge is aligned with the measured orientation of the image capture device along the first axis based on, at least in part, the first angular difference; and
   modify the data so that the orientation of the first straight edge is aligned with the measured orientation of the image capture device along the second axis based on, at least in part, the second angular difference.

17. The non-transitory program storage device of claim 9, further comprising instructions to cause the one or more processors to display the image and a distortion indication on a display, wherein the distortion indication is related to the measured orientation of the image capture device.

18. The non-transitory program storage device of claim 9, further comprising instructions to cause the one or more processors to store the measured orientation of the image capture device in a header region of a file in which the data is also stored.

19. The non-transitory program storage device of claim 9, wherein the instructions to cause the one or more processors to modify the data comprise instructions to cause the one or more processors to modify the data on-the-fly.

* * * * *

UNITED STATES PATENT AND TRADEMARK OFFICE
CERTIFICATE OF CORRECTION

| | | |
|---|---|---|
| PATENT NO. | : 8,687,070 B2 | Page 1 of 1 |
| APPLICATION NO. | : 12/644800 | |
| DATED | : April 1, 2014 | |
| INVENTOR(S) | : Jason Hau-Ping Chen et al. | |

It is certified that error appears in the above-identified patent and that said Letters Patent is hereby corrected as shown below:

In the Claims:

Column 10, lines 1-2 (Claim 9, lines 7-8), add --to-- after the phrase "data corresponding".

Signed and Sealed this
Seventeenth Day of June, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,687,070 B2  Page 1 of 1
APPLICATION NO. : 12/644800
DATED : April 1, 2014
INVENTOR(S) : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this
Thirtieth Day of May, 2017

Michelle K. Lee
*Director of the United States Patent and Trademark Office*